US010209579B2

(12) United States Patent
Chen et al.

(10) Patent No.: US 10,209,579 B2
(45) Date of Patent: Feb. 19, 2019

(54) PIXEL ELECTRODE AND ARRAY SUBSTRATE (71) Applicant: Shenzhen China Star Optoelectronics Technology Co., Ltd., Shenzhen (CN)

(72) Inventors: Cheng Hung Chen, Shenzhen (CN); Xiaohui Yao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/897,741

(22) PCT Filed: Oct. 30, 2015

(86) PCT No.: PCT/CN2015/093321
§ 371 (c)(1),
(2) Date: Dec. 12, 2017

(87) PCT Pub. No.: WO2017/049713
PCT Pub. Date: Mar. 30, 2017

(65) Prior Publication Data
US 2018/0136523 A1 May 17, 2018

(30) Foreign Application Priority Data
Sep. 25, 2015 (CN) .......................... 2015 1 0617574

(51) Int. Cl.
G02F 1/1337 (2006.01)
G02F 1/1343 (2006.01)

(52) U.S. Cl.
CPC .. *G02F 1/134309* (2013.01); *G02F 1/133707* (2013.01); *G02F 2001/133757* (2013.01); *G02F 2201/123* (2013.01)

(58) Field of Classification Search
CPC ....................... G02F 1/134309; G02F 1/1343
(Continued)

(56) References Cited

U.S. PATENT DOCUMENTS

2011/0199550 A1 8/2011 Fan et al.
2013/0050629 A1 2/2013 Kang
(Continued)

FOREIGN PATENT DOCUMENTS

CN 102305983 A 1/2012
CN 102540585 A 7/2012
(Continued)

OTHER PUBLICATIONS

Notification of Transmittal of the International Search Report and the Written Opinion of the International Searching Authority (Forms PCT/ISA/210, PCT/ISA/237, and PCT/ISA/220) dated May 27, 2016, by the State Intellectual Property Office of People's Republic of China in corresponding International Application No. PCT/CN2015/093321 (11 pages).
(Continued)

*Primary Examiner* — Lucy P Chien (57) ABSTRACT

Disclosed is a pixel electrode and an array substrate. The pixel electrode comprises four pixel domains, each of which is divided into a first alignment unit and a second alignment unit. The first alignment unit and the second alignment unit can be used to form a first electric field and a second electric field respectively, and the first and second electric fields are different in intensity. The pixel electrode effectively reduces color distortions on a large-size liquid crystal display device observed from a large viewing angle as well as ensures an aperture ratio of a pixel, which enhances the competitiveness of a product.

7 Claims, 4 Drawing Sheets (58) Field of Classification Search
USPC .......................................................... 349/139
See application file for complete search history.

(56) References Cited

U.S. PATENT DOCUMENTS

| | | |
|---|---|---|
| 2014/0009719 A1 | 1/2014 | Xu |
| 2014/0267994 A1 | 9/2014 | Ryu et al. |
| 2015/0146125 A1 | 5/2015 | Kita et al. |

FOREIGN PATENT DOCUMENTS

| | | |
|---|---|---|
| CN | 102768443 A | 11/2012 |
| CN | 103529603 A | 1/2014 |
| CN | 104049420 A | 9/2014 |
| CN | 104272179 A | 1/2015 |
| CN | 104375340 A | 2/2015 |
| TW | 201120542 A | 6/2011 |

OTHER PUBLICATIONS

Office Action dated Aug. 25, 2017 by the State Intellectual Property Office of People's Republic of China in corresponding Chinese Patent Application No. 201510617574.8. (6 pages).

PIXEL ELECTRODE AND ARRAY SUBSTRATE

CROSS-REFERENCE TO RELATED APPLICATIONS

The present application claims the priority of Chinese patent application CN 201510617574.8, entitled "Pixel electrode and array substrate" and filed on Sep. 25, 2015, the entirety of which is incorporated herein by reference.

TECHNICAL FIELD

The present disclosure relates to the field of liquid crystal display, and in particular, to a pixel electrode and an array substrate.

TECHNICAL BACKGROUND

In the prior art, a pixel electrode of a vertical alignment (VA) liquid crystal display device, is generally divided into four pixel domains. Each pixel domain forms a display domain, and liquid crystal molecules in different display domains are differently aligned. A viewing angle of the VA liquid crystal display device can be increased by mutual compensation between liquid crystal molecules. However, since the birefringence of liquid crystal molecules in one direction is greatly different from the birefringence of liquid crystal molecules in another direction, color distortions in varying degrees will appear on a display screen observed from different viewing angles when the liquid crystal molecules are differently aligned.

Figure 1:
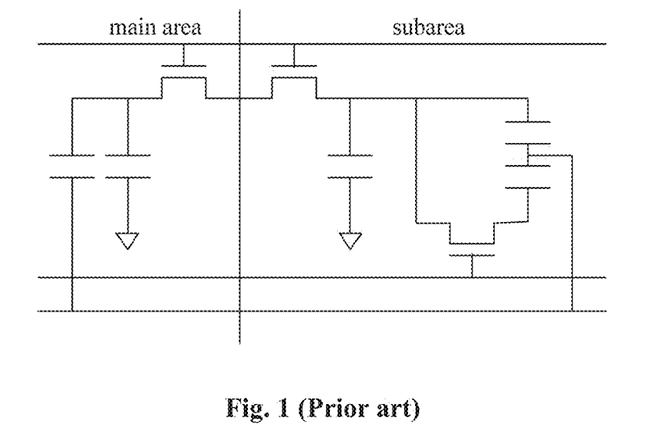
FIG. 1 schematically shows a principle for achieving multi-domain display in the prior art.

To reduce color distortions observed from a large viewing angle, the display domains are generally increased. That is, as shown in FIG. 1, each pixel domain of the pixel electrode is divided into two parts. One part is a main area of the pixel domain, and the other part is a subarea of the pixel domain. Drive elements are disposed within the main area and the subarea respectively. Color distortions observed from a large viewing angle are reduced by applying different voltages to the main area and the subarea, and this manner is generally termed Low Color Shift (LCS) design.

The LCS design reduces color distortions on the liquid crystal display device observed from a large viewing angle. However, since each pixel domain is further divided and drive elements need to be disposed within the main area and the subarea respectively, the aperture ratio of the pixel will be necessarily decreased. Moreover, during an LCS design, the effective electric potential applied to the liquid crystal molecules within the subarea is generally lower than the effective electric potential applied to the liquid crystal molecules within the main area. This will cause decreasing of the display brightness in the subarea, and further affect the transmittance of the liquid crystal display device. Increasing the viewing angle and improving the transmittance are equally important for large-size liquid crystal display devices, particularly for ultra high definition television products.

To sum up, there is an urgent need of a new method for reducing color distortions on vertical alignment liquid crystal display device observed from a large viewing angle to solve the abovementioned problem.

SUMMARY OF THE INVENTION

One of the technical problems to be solved by the present disclosure is how to reduce color distortions on vertical alignment liquid crystal display device observed from a large viewing angle.

To solve the aforementioned technical problem, the present disclosure first provides, in an embodiment thereof, a pixel electrode comprising four pixel domains, and each of the pixel domains is divided into a first alignment unit and a second alignment unit respectively, wherein the first alignment unit can be used to form a first electric field, and the second electric unit can be used to form a second electric field, intensity of the first electric field being unequal to intensity of the second electric field.

Preferably, a plurality of branch electrodes, which are equally spaced from and parallel to each other, are disposed within each alignment unit of respective pixel domains, and further a distance between respective branch electrodes in the first alignment units is not equal to a distance between respective branch electrodes in the second alignment units in a same pixel domain.

Preferably, distances between respective branch electrodes in the first alignment units within different pixel domains are equal, and distances between respective branch electrodes in the second alignment units within different pixel domains are equal.

Preferably, areas of the first alignment units within different pixel domains are equal, and areas of the second alignment units within different pixel domains are equal.

Preferably, the first alignment units within different pixel domains are respectively symmetrical to each other in a vertical direction and a horizontal direction, and the second alignment units within different pixel domains are respectively symmetrical to each other in the vertical direction and the horizontal direction.

Preferably, the pixel domains are adjacent to each other in the vertical and horizontal directions to form a gird-shape. Vertically intersecting trunk electrodes are disposed on peripheral edges of each of the pixel domains. And the branch electrodes of the first alignment units and the branch electrodes of the second alignment units respectively extend from a plurality of vertical intersections of the trunk electrodes in a radial pattern.

Preferably, the branch electrodes of each of the first alignment units are distributed at a vertical intersection of the trunk electrodes in a middle of the grid-shape, and the branch electrodes of each of the second alignment units are distributed at vertical intersections of the trunk electrodes at four corners of the grid-shape.

Preferably, within each of the pixel domains, the branch electrodes of the first alignment unit and the branch electrodes of the second alignment unit respectively extend to demarcation lines of respective alignment units; a plurality of gaps are formed between respective extending ends of the branch electrodes and are distributed roughly in a straight line.

Preferably, the plurality of gaps are distributed roughly in an arc or in a polygonal line.

The present disclosure also provides in an embodiment thereof, an array substrate comprising a pixel unit array, and a pixel electrode is disposed within each pixel unit.

Compared with the prior art, one embodiment or a plurality of embodiments of the aforementioned solution have the following advantages or achieve the following beneficial effects.

Electric fields with different intensities are formed within a same pixel domain by means of pixel electrodes. The pixel electrodes effectively reduce the color distortions on large-size liquid crystal display device observed from a large viewing angle as well as ensure the aperture ratio of a pixel, thereby enhancing the competitiveness of a product.

Other advantages, objectives, and features of the present disclosure will be further explained in the following description to a certain degree, and they will become self-evident for those skilled in the art in view of the following description of the present disclosure, or teachings can be obtained through the implementation of the present disclosure. The objectives and other advantages of the present disclosure will be achieved through the structures specifically pointed out in the description, claims, and the accompanying drawings.

BRIEF DESCRIPTION OF THE DRAWINGS

The accompanying drawings are provided for further understanding the technical solutions of the present disclosure or the prior art, and constitute one part of the description. They accompanying drawings for illustrating the embodiments of the present disclosure serve to explain the technical solutions of the present disclosure in conjunction with the embodiments, rather than to limit the present disclosure in any manner. In the drawings.

DETAILED DESCRIPTION OF THE EMBODIMENTS

The implementation manner of the present disclosure will be explained in detail below with reference to the accompanying drawings and the embodiments, so that one can fully understand how the present disclosure solves the technical problem and achieves the technical effects through the technical means, thereby implementing the same. It should be noted that as long as there is no conflict, any of the embodiments and any of the technical features thereof may be combined with one another, and the technical solutions obtained therefrom all fall within the scope of the present disclosure.

The following descriptions of the embodiments refer to the accompanying drawings, and are provided for exemplifying particular embodiments that the present disclosure can be applied to. The terms of directions used in the present disclosure, such as "up," "down," "left," "right," and so on, only refer to the directions in the accompanying drawings. Therefore, the terms of directions serve to explain the present disclosure and make the present disclosure be understood, and they do not limit the present disclosure.

It can be understood that in a vertical alignment liquid crystal display device which uses a multi-domain display, pixel electrodes on a substrate arranged on one side cooperate with a common electrode arranged on a substrate of the other side to form electric fields for driving liquid crystal molecules within a display domain to rotate. The purpose of respective embodiments below is to illustrate the structure of the pixel electrode, and specific form of the common electrode is not defined. Without departing from the spirit and essence of the present disclosure, any form, for example, a planar electrode, can be used for the common electrode.

In the embodiment of the present disclosure, two kinds of electric fields with different intensities are formed in a same pixel domain by means of the structure of the pixel electrode. When the electric fields with different intensities are applied to the liquid crystal molecules in the pixel domains simultaneously, the liquid crystal molecules within different electric fields will be deflected in different angles to achieve optical compensations, so that color distortions observed from a large viewing angle can be reduced. Specifically, each pixel domain of the pixel electrode can be divided into a first alignment unit and a second alignment unit. That is, eight alignment units can be formed in a pixel electrode comprising four pixel domains. The first alignment unit within each pixel domain is used to form a first electric field, and the second alignment unit within each pixel domain is used to form a second electric field. In addition, the intensity of the first electric field is unequal to the intensity of the second electric field. Explanations will be provided in combination with FIG. 2.

Figure 2:
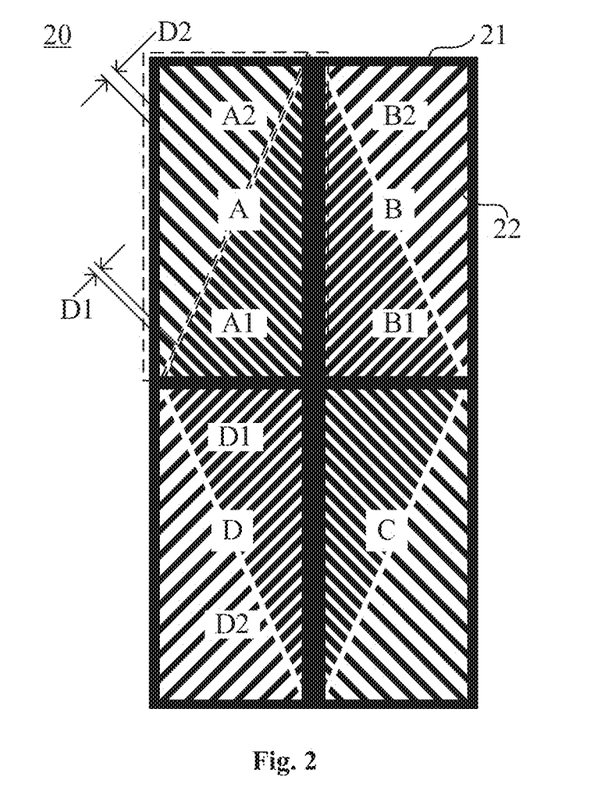
FIG. 2 schematically shows the structure of a pixel electrode in an embodiment of the present disclosure.

FIG. 2 schematically shows the structure of a pixel electrode 20 in the embodiment of the present disclosure. It can be seen from FIG. 2 that the pixel electrode 20 has four pixel domains A, B, C, and D which have equal areas. The pixel electrode 20 is divided by vertically intersecting trunk electrodes 21, and rectangular trunk electrodes 21 are disposed on peripheral edges of the pixel electrode 20. That is, respective pixel domains are adjacent to each other in a vertical direction or in a horizontal direction to form a grid-shape. The trunk electrodes 21 are mainly used to support branch electrodes 22. The branch electrodes 22 are strip-shaped electrodes parallel to each other, and a plurality of branch electrodes 22 are distributed with equal distances from each other. If distances between respective branch electrodes 22 are not even, uneven display would easily occur on the liquid crystal display device.

Further, the plurality of branch electrodes 22 extend from a plurality of vertical intersections of the trunk electrodes 21 in a radial pattern. Extending ends of the plurality of branch electrodes 22, which extend oppositely to each other, form a plurality of gaps in diagonal lines of the pixel domains, and the gaps are distributed roughly in straight lines. With the pixel domain A as an example, the branch electrodes 22 within the pixel domain A respectively extend from two opposite vertex angles of the pixel domain A to an internal part thereof, and a roughly straight demarcation line is formed in the diagonal line of the pixel domain A. Two parts of the pixel domain A, both of which contain the branch electrodes 22, are respectively marked as a first alignment unit A1 and a second alignment unit A2, i.e., the two parts enclosed by dash lines as shown in FIG. 2. In the pixel domain A, the branch electrodes 22 in the first alignment unit A1 are distributed at a vertical intersection of the trunk electrodes 21 in a middle of the grid-shape, and the branch electrodes 22 in the second alignment unit A2 are distributed at a vertical intersection of the trunk electrodes 21 at a vertex angle of the grid-shape. As shown in FIG. 2, corresponding arrangements are made in the pixel domains B, C, and D, and details thereof will not be further explained here.

It is to be noted that the pixel domains A, B, C, and D, as well as the first alignment units and the second alignment units within the pixel domains A, B, C, and D, are generally disposed as symmetrical to each other respectively in the vertical direction and in the horizontal direction. As shown in FIG. 2, the pixel domains A and B, the first alignment units A1 and B1, and the second alignment units A2 and B2 are respectively symmetrical to each other along a vertical axis. Likewise, the pixel domains A and D, the first alignment units A1 and D1, and the second alignment units A2 and D2 are respectively symmetrical to each other along a horizontal axis. This is because the vertical alignment liquid crystal display device compensates the viewing angle mainly by a working state when liquid crystal molecules produce symmetrical deflections. Only when the liquid crystal domains are arranged in a highly symmetrical manner, can display equilibrium in four directions, i.e., up, down, left, and right of the liquid crystal display device be achieved.

In the embodiment of the present disclosure, within the pixel domains A, B, C, and D, a distance between the branch electrodes in the first alignment units is not equal to a distance between the branch electrodes in the second alignment units. As shown in FIG. 2, a distance D1 between the branch electrodes 22 in the first alignment unit A1 is not equal to a distance D2 between the branch electrodes 22 in the second alignment unit A2. When a certain gray scale voltage is applied to the pixel electrode 20, due to the influence of the distances D1 and D2, electric fields with different intensities will be generated respectively in scopes of the first alignment unit A1 and the second alignment unit A2. The intensity of an electric field formed between pixel electrodes and a common electrode generally depend on the value of gray scale voltage applied to the pixel electrodes, the thickness of a liquid crystal cell (which is a comprehensive effect of working states of respective layers of liquid crystal), and the size of protrusions on the pixel electrodes and/or the size of slits on the pixel electrodes. In the embodiment of the present disclosure, the values of the gray scale voltages applied to the pixel electrode 20 are equal, and the thicknesses of the liquid crystal cell are equal. Therefore, the intensity of the electric fields in the scopes of the first alignment unit and the second alignment unit depend on the size of the slits on the pixel electrode 20. That is, the intensity of the electric fields is dependent on the distances between the branch electrodes 22.

Figure 3:
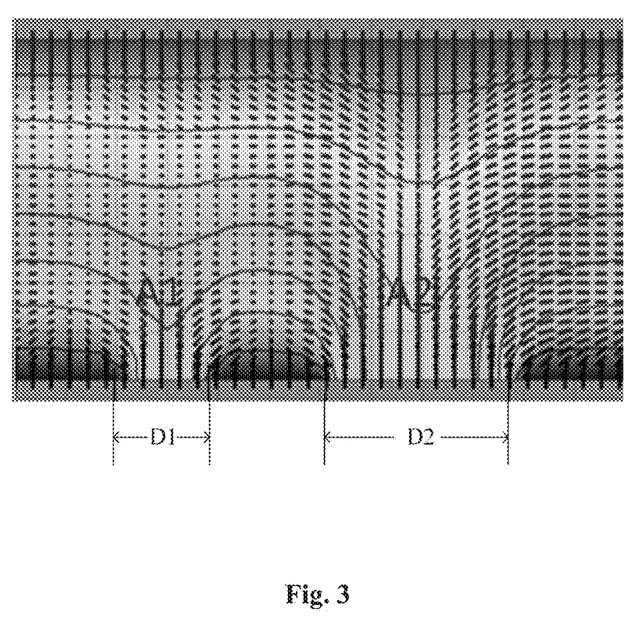
FIG. 3 schematically shows distribution of electric fields formed in the embodiment of the present disclosure.

FIG. 3 schematically shows the distribution of the electric fields generated in the embodiment of the present disclosure. As shown in FIG. 3, the distribution of electric field lines of the electric field is denser in a region where the distance between the branch electrodes is D1, which means that the intensity of the electric field in the alignment unit A1 is larger than the intensity of the electric field in the alignment unit A2. Due to influences of the abovementioned electric fields, the liquid crystal molecules in the first alignment unit A1 and the liquid crystal molecules in the second alignment unit A2 will defect in different angles. That is, two display domains can be formed in the pixel domain A. Furthermore, in the pixel domains B, C, and D, the distances between the branch electrodes 22 in the first alignment units and in the second alignment units are respectively D1 and D2, and electric fields with different intensities will be generated in the pixel domains B, C, and D respectively.

Figure 4:
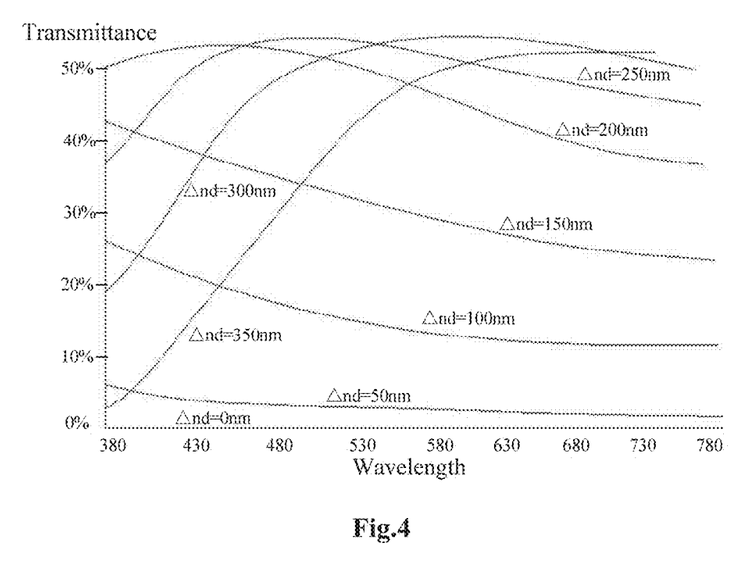
FIG. 4 schematically shows a relationship between transmittance and wavelength of a vertical alignment liquid crystal display device.

FIG. 4 schematically shows a relationship between the transmittance and wavelength of the vertical alignment liquid crystal display device. As shown in FIG. 4, the lateral axis refers to the wavelength, and the ordinate axis refers to the transmittance; $\Delta nd$ is a comprehensive index that influences the transmittance of the vertical alignment liquid crystal display device, wherein $\Delta n$ refers to the birefringence of the liquid crystal, and d refers to the thickness of the liquid crystal cell (which is a comprehensive effect of the working states of respective layers of liquid crystal). It can be seen that, with the increasing of $\Delta nd$, the dependence relationship between the transmittance and the wavelength of the liquid crystal display device becomes more obvious. The original white balance of the liquid crystal display device, after a red, green, and blue color mixture, is broken, and thus color distortions in varying degrees will be produced. A main way for reducing color distortions is to enable liquid crystal molecules to be aligned as closely and evenly as possible within a scope of 360 degrees and perform optical compensations between light with different wavelengths. The pixel electrode 20 having four pixel domains can be displayed in eight domains through further division of the four pixel domains (i.e. liquid crystal molecules aligned in four different manners) into eight alignment units, thereby further reducing color distortions on large-size liquid crystal display devices.

Besides, in the prior art, different drive voltages are applied to different parts of a same pixel domain, so that eight-domain display can be achieved (as shown in FIG. 1). Compared with the prior art, since there is no need to provide drive circuits respectively in the present disclosure, the manufacture procedure and the driving manner can be simplified, and the aperture ratio of a pixel can be improved as well.

Further, as shown in FIG. 2, when the distance D2 is larger than the distance D1, the electric field intensity in the first alignment unit A1 will be larger than the electric field intensity in the second alignment unit. Therefore, the liquid crystal molecules within the first alignment A1 will have a larger deflection angle than the liquid crystal molecules within the second alignment A2. The larger the deflection angle the molecules have, the more light passes through the liquid crystal layer, i.e., the transmittance of the crystal liquid display device is higher. The higher the transmittance of the crystal liquid display is, the brighter the liquid crystal screen is, and further the displayed image is more beautiful and clearer. Therefore, the transmittance of the liquid crystal display device can be adjusted by adjustment of the distances between the branch electrodes 22, so as to satisfy a display requirement.

It can also be seen from FIG. 2 that the demarcation line between the first alignment unit A1 and the second alignment unit A2 roughly overlaps a diagonal line of the pixel domain A. That is, the area of the first alignment unit A1 equals the area of the second alignment unit A2. In other words, it can be deemed that the number of liquid crystal molecules within the first alignment unit equals the number of liquid crystal molecules within the second alignment unit. In other embodiments of the present disclosure, the area of the first alignment unit and the area of the second alignment unit can be adjusted as unequal to each other. The more liquid crystal molecules the alignment unit contains, the more light passes through the liquid crystal layer, which means that the transmittance of the crystal liquid display is higher. The higher the transmittance of the crystal liquid display device is, the brighter the liquid crystal screen is, and further the displayed image is more beautiful and clearer. Therefore, in order to enable the liquid crystal display device to satisfy the display requirements, the distances between the branch electrodes 22 and/or the areas of the first alignment unit and the second alignment unit can be adjusted based on the result of a simulation.

It needs to be noted that since the liquid crystal molecules in the first alignment unit A1 are aligned in a same direction as the liquid crystal molecules in the second alignment unit A2, the same adjusting functions can also be achieved by interchanging the arrangements of the first alignment unit A1 and the second alignment unit A2. That is, the distance D1 between the branch electrodes 22 in the first alignment unit A1 can be arranged to be larger than the distance D2 between the branch electrodes 22 in the second alignment unit A2; or the area of the first alignment unit A1 can be arranged to be larger smaller) than the area of the second alignment unit A2; or the distances between the branch electrodes 22 in the first and second alignment units and the areas of the first and second alignment units can be both changed.

Figure 5A:
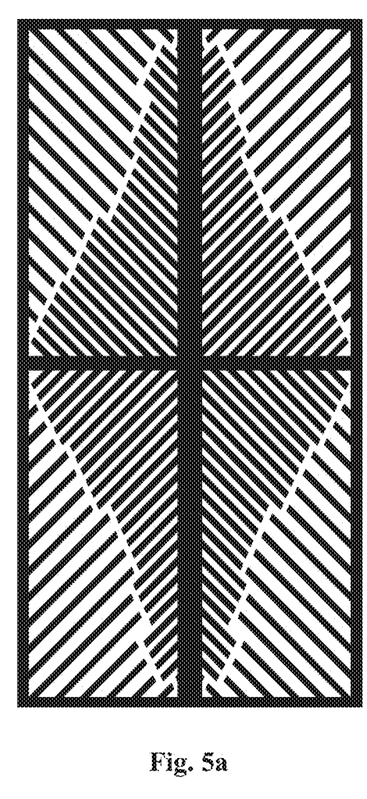
FIG. 5a to FIG. 5b schematically show the structures of the pixel electrode in other embodiments of the present disclosure.
Figure 5B:
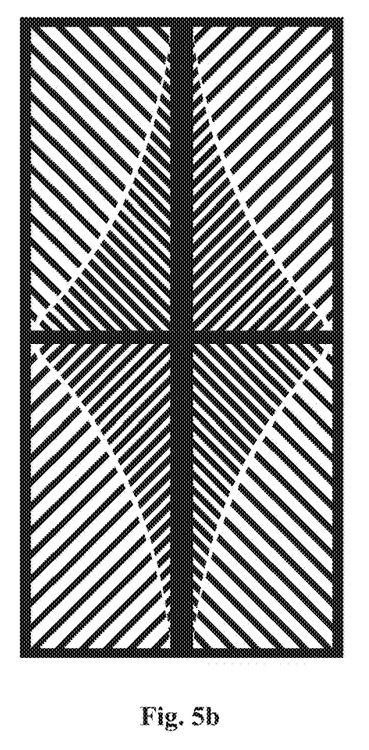

FIG. 5a to FIG. 5b schematically shows the structures of the pixel electrode in other embodiments of the present disclosure. As shown in FIG. 5a to FIG. 5b, the demarcation lines between the first and second alignment units, which are formed by the gaps between the extending ends of the branch electrodes, are no longer overlapping the diagonal lines of the pixel domains. In FIG. 5a, the demarcation lines are roughly polygonal lines. The pixel electrode 20 with the aforementioned structure is favorable for minor changes in the areas of the first alignment units and the areas of the second alignment units. In FIG. 5b, the demarcation lines are roughly arc lines. Generally, continuous and smooth demarcation lines can render the electric field homogeneous, and further lead to continuous variation in alignment of the liquid crystal molecules, which is favorable for improving the display effect of the liquid crystal display device. Therefore, the structure with smooth demarcation lines is preferably used for the pixel electrode. Further, the demarcation lines between the first and second alignment units, which are formed by the gaps between the extending ends of the branch electrodes, can also be in other patterns. As long as it is ensured that the areas of respective first alignment units within different pixel domains are equal and that the areas of respective second alignment units within different pixel domains are equal, the liquid crystal domains can be symmetrical, thereby achieving the purpose of reducing color distortions.

The pixel electrode in the embodiment of the present disclosure can improve the aperture ratio of pixels and can reduce color distortions observed from a large viewing angle. Since there is no need to apply drive voltages to different parts of a domain of the pixel electrode, the manufacture procedure and the design of drive circuits can be simplified, thereby reducing the production cost and enhancing the competitiveness of a product.

In other embodiments of the present disclosure, an array substrate is further provided, on which a pixel unit array is arranged, and the pixel electrode 20 having the aforementioned structure is arranged within each pixel unit. The details of the structure of the pixel electrode 20 will not be repeated here.

Figure 6:
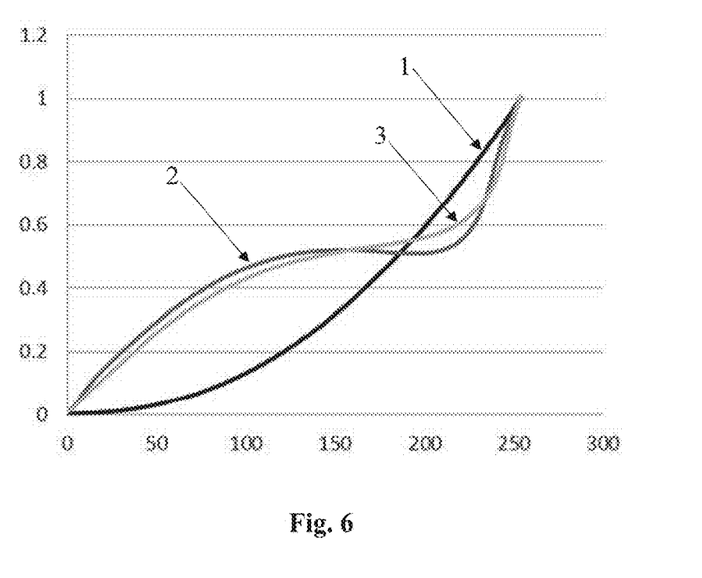
FIG. 6 schematically shows a contrast of gamma curves.

FIG. 6 schematically shows a contrast of gamma curves. In the drawing, curve 1 is a standard gamma curve when the liquid crystal screen is observed from a front view, and curve 2 is a gamma curve when an eight-domain mode in the prior art is used for display. It can be seen that there is still a bigger fluctuation in the gamma curve when the eight-domain in the prior art is used for display than in the standard gamma curve when the liquid crystal screen is observed from the front view. Curve 3 is a gamma curve when the liquid crystal screen, made of the pixel electrodes in the present disclosure, is used for the display. It can be seen that the gamma curve when the liquid crystal screen, made of the pixel electrodes in the present disclosure, is used for the display is much closer to the standard gamma curve shown by curve 1, and thus the liquid crystal effect is improved by the liquid crystal screen made of the pixel electrodes in the present disclosure.

The above embodiments are described only for better understanding, rather than restricting the present disclosure. Anyone skilled in the art can make any amendments or changes to the implementing forms or details without departing from the spirit and scope of the present disclosure. The scope of the present disclosure should be subject to the scope defined in the claims.

The invention claimed is:

1. A pixel electrode comprising four pixel domains, each pixel domain being divided into a first alignment unit and a second alignment unit respectively,
    wherein the first alignment unit can be used to form a first electric field, and the second alignment unit can be used to form a second electric field, intensity of the first electric field being unequal to intensity of the second electric field,
    wherein a plurality of branch electrodes, which are equally spaced from and parallel to each other, are disposed within each alignment unit of respective pixel domains, and
    wherein a distance between respective branch electrodes in the first alignment unit is not equal to a distance between respective branch electrodes in the second alignment unit in a same pixel domain,
    wherein the pixel domains are adjacent to each other in a vertical direction and a horizontal direction to form a grid-shape,
    wherein vertically intersecting trunk electrodes are disposed on a peripheral edge of each of the pixel domains, and
    wherein the branch electrodes of the first alignment units and the branch electrodes of the second alignment units extend from a plurality of vertical intersections of the trunk electrodes in a radial pattern,
    wherein the branch electrodes of each of the first alignment units are distributed at a vertical intersection of the trunk electrodes in a middle of the grid-shape, and the branch electrodes of each of the second alignment units are distributed at vertical intersections of the trunk electrodes at four corners of the grid-shape,
    wherein within each of the pixel domains, the branch electrodes of the first alignment unit and the branch electrodes of the second alignment unit respectively extend to demarcation lines of respective alignment units, and
    wherein a plurality of gaps are formed between respective extending ends of the branch electrodes.

2. The pixel electrode according to claim 1, wherein distances between respective branch electrodes in the first alignment units within different pixel domains are equal, and distances between respective branch electrodes in the second alignment units within different pixel domains are equal.

3. The pixel electrode according to claim 2, wherein areas of the first alignment units within different pixel domains are equal, and areas of the second alignment units within different pixel domains are equal.

4. The pixel electrode according to claim 3, wherein the first alignment units within different pixel domains are respectively symmetrical to each other in a vertical direction and a horizontal direction, and the second alignment units within different pixel domains are respectively symmetrical to each other in the vertical direction and the horizontal direction.

5. The pixel electrode according to claim 1, wherein the plurality of gaps are distributed roughly in a straight line.

6. The pixel electrode according to claim 1, wherein the plurality of gaps are distributed roughly in an arc line or a polygonal line.

7. An array substrate comprising a pixel unit array, wherein a pixel electrode is disposed within each pixel unit, and the pixel electrode includes four pixel domains, each pixel domain being divided into a first alignment unit and a second alignment unit; and wherein the first alignment unit can be used to form a first electric field, and the second electric unit can be used to form a second electric field, intensity of the first alignment unit being unequal to intensity of the second alignment unit, wherein a plurality of branch electrodes, which are equally spaced from and parallel to each other, are disposed within each alignment unit of respective pixel domains, and wherein a distance between respective branch electrodes in the first alignment unit is not equal to a distance between respective branch electrodes in the second alignment unit in a same pixel domain, wherein the pixel domains are adjacent to each other in a vertical direction and a horizontal direction to form a grid-shape, wherein vertically intersecting trunk electrodes are disposed on a peripheral edge of each of the pixel domains, and wherein the branch electrodes of the first alignment units and the branch electrodes of the second alignment units extend from a plurality of vertical intersections of the trunk electrodes in a radial pattern, wherein the branch electrodes of each of the first alignment units are distributed at a vertical intersection of the trunk electrodes in a middle of the grid-shape, and the branch electrodes of each of the second alignment units are distributed at vertical intersections of the trunk electrodes at four corners of the grid-shape, wherein within each of the pixel domains, the branch electrodes of the first alignment unit and the branch electrodes of the second alignment unit respectively extend to demarcation lines of respective alignment units, and wherein a plurality of gaps are formed between respective extending ends of the branch electrodes.

* * * * *